United States Patent [19]

Holcblat

[11] Patent Number: 4,738,698
[45] Date of Patent: Apr. 19, 1988

[54] FINNED LIQUID PARTICLES SEPARATOR

[75] Inventor: Alain Holcblat, Issy Les Moulineaux, France

[73] Assignee: Novatome, Courbevoie, France

[21] Appl. No.: 49,884

[22] Filed: May 14, 1987

[30] Foreign Application Priority Data

May 14, 1986 [FR] France .................. 86 06939

[51] Int. Cl.$^4$ ............................................. B01D 45/08
[52] U.S. Cl. ................................................... 55/440
[58] Field of Search ................... 55/440, 397, 257 PV

[56] References Cited

U.S. PATENT DOCUMENTS

| | | | |
|---|---|---|---|
| 2,973,056 | 2/1961 | Sillers, Jr. ................ | 55/440 X |
| 3,517,486 | 6/1970 | Golden ..................... | 55/440 |
| 3,520,116 | 7/1970 | Good ........................ | 55/440 |
| 3,751,886 | 8/1973 | Sokolowski .............. | 55/440 X |
| 3,805,496 | 4/1974 | Sokolowski .............. | 55/440 |
| 3,938,972 | 2/1976 | Sugimura ................. | 55/440 |
| 3,950,156 | 4/1976 | Kall .......................... | 55/440 |

FOREIGN PATENT DOCUMENTS 1036799 8/1978 Canada .................. 55/440

Primary Examiner—Kathleen J. Prunner
Attorney, Agent, or Firm—Pollock, Vande Sande & Priddy

[57] ABSTRACT

A separator disposed in parallel relationship is provided for separating liquid particles entrained in a gas stream. It comprises zigzag walls (25) having fins (27) each covering each of the convex folds (28) of the walls while forming an open scoop (29) facing the gas flow. Each fin has a portion (27a, 27b) parallel to the wall (25) which supports it and which is spaced apart from said wall upstream and downstream of the fold (28). A rear connection zone (27c) gradually joins the wall and is connected along a line located substantially in the same plane orthogonal to the two walls defining a channel for the gas flow than the leading edge of the following fin (27).

6 Claims, 2 Drawing Sheets

FINNED LIQUID PARTICLES SEPARATOR

BACKGROUND OF THE INVENTION

The present invention relates to an apparatus for separating entrained liquid particles from a stream of gas of the type having an enclosure in which are disposed a plurality of generally parallel partitions of zig zag horizontal cross-sectional shape distributed at even intervals and defining a plurality of inter-partitions channels constituting respective sinuous travelling paths for said stream of gas.

It relates particularly to an apparatus or separator whose partitions carry fins covering each convex fold of said partitions, each fin forming with its supporting partition an open scoop facing the gas flow.

The invention is particularly, also not exclusively, suitable for high efficiencies eliminators used for natural circulation steam generators of nuclear reactors.

Gas-liquid separators of the above defined type are already known. The document FR-A-No. 1 541 045, relating to a device for separating liquid from a gaseous fluid, shows a separator construction in which partitions or "blade elements" present regular series of successive convex folds and concave folds. Fins are fixed on each convex fold and extend from said fold in the direction of the gas flow for collecting or trapping the liquid.

This type of separator, although it presents a high efficiency for a drop size distribution with size larger than the limit drop size to consider, has the drawback of important pressure drops for a given flow rate.

The limit drop size is the size of the smallest drop which, for given separator construction, gas velocity and characteristics of the liquid and gas involved, can just be completely eliminated.

SUMMARY OF THE INVENTION

It is an object of the invention to provide an improved separator of the above defined type; it is a more particular object to provide a high efficiency liquid gas separator for a given limit drop size presenting low pressure drops.

For this purpose, the invention provides an apparatus having an enclosure, a plurality of generally parallel partitions of zigzag horizontal cross-sectional shape distributed at even intervals within the enclosure and defining a plurality of inter-partition channels constituting respective sinuous travelling paths for said stream of gas, each of said paths having alternated bends each defined by a concave vertical fold of one of the partitions defining the path and a convex vertical fold of the other partition defining the path, each of said convex vertical folds being provided with a respective vertically extending channel defining a fin. Each of said fins has a first portion covering the respective convex fold, substantially parallel to said respective convex fold and at a distance thereof over a length which is a fraction of the distance between two successive folds, (i.e. a convex and a concave folds on the same partition) therefore defining an open scoop having a leading edge and facing the gas flow, and a second portion fixed to the corresponding supporting partition said second portion progressively joining said partition until reaching the partition along a "root" line on the downstream part of the fold covered by the fin, said root line being substantially located in the same plan orthogonal to the two partitions defining the channel than the leading edge of the next downstream following fin covering the downstream following fold of the opposite partition of said channel. The first portion of each fin is in spaced relationship with its supporting partition, said first portion covering the convex fold on a certain distance upstream and a certain distance downstream from the sumit of said convex fold.

The invention also provides an apparatus for separating entrained liquid particles from a stream of gas which flows in a general horizontal direction comprising an enclosure and a plurality of generally parallel partitions of zigzag horizontal cross-sectional shape distributed at even intervals within said enclosure and defining a plurality of inter-partition channels constituting respective sinuous travelling paths for said stream of gas, each of said path having alternate bends each defined by a concave vertical fold of one of the partitions defining the paths and a convex vertical fold of the other partition defining the path, and each of said convex vertical folds being provided with a respective vertically extending channel defining a fin forming an open scoop with said partition wherein the fins of a same channel are arranged to define with the opposite corresponding partition of said channel a substantially constant flow section for the gas flow all along the path of said gas flow in said channel.

In an advantageous embodiment, each fold of the zigzag partitions or walls is formed by a single bend.

In a preferred embodiment, each fin is connected to the corresponding partition by a distal end having a bend part which matches the shape of said partition over a length including the following concave vertical fold succeeding the convex vertical fold covered by said fin. Advantageously, each fold forming bend of the zigzag partitions is a sharp angled dihedron.

In order to easily connect together the different zigzag partitions, in a preferred embodiment, each zigzag partition is provided with at least four spacer elements disposed at the periphery of said partitions, each of the spacer elements having an aperture on one side and a stud on the other side, the studs of the spacer elements of a partition being arranged for insertion in the corresponding apertures of the spacer elements of the adjacent partition for connection.

This allows an even spacing between the partitions.

This spacing is determined so as to prevent the gas stream or flow from passing directly between two adjacent finned walls or partitions. The different partitions or walls may be maintained in position by the following advantageous arrangement: the zigzag partitions are fitted between two plates, one of the plates being supported on a first wall of the enclosure and the other being pressed and maintained with screws whose threads engaged the opposite wall of the enclosure, the head of said screws being connected together with small plates, blades or rods.

SHORT DESCRIPTION OF THE DRAWINGS

The invention will be better understood from reading the following description of a particular embodiment, given by way of non limitative example. The description refers to the accompanying drawings in which.

DETAILED DESCRIPTION OF A PREFERRED EMBODIMENT

Figure 1:
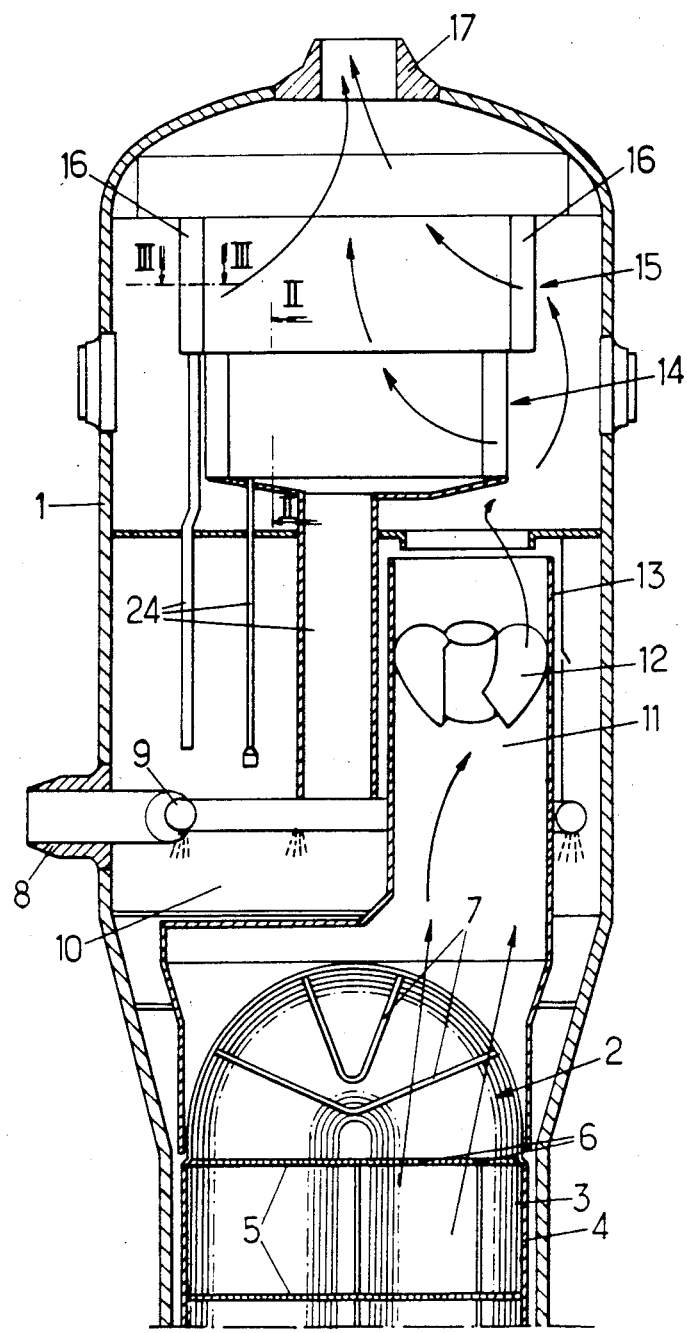
FIG. 1 is a schematical view in vertical section of the upper part of a steam generator of a pressurized water nuclear reactor having apparatuses of the type described in the invention.

FIG. 1 shows schematically in section the upper part of a steam generator equipping each main steam line of the cooling circuit of a pressurized water reactor.

The steam generator comprises an enclosure 1, an evaporator assembly 2 formed by a bundle of tubes 3 (partially shown) disposed in the form of an upturned U and through which flows the primary pressurized water which comes from the vessel of the reactor and which penetrates into the generator and leaves through the bottom of the generator (not shown).

These tubes 3 are mounted in a cylindrical casing 4 having spacer plates 6 pierced with holes 5, some of which are used for letting tubes 3 pass therethrough and for holding them in position.

Antivibratory spacers 7 further hold tubes 3 in position in their bent part. The water of the secondary coolant circuit, to be vaporized for driving a turbine, is fed into the generator through an inlet pipe 8 and is distributed over the periphery of the steam generator by the supply ring 9 in the water supply zone 10.

The generator further comprises at the top part at least one humidity separator 11 of known type, including a fan 12 and a cylindrical wall 13.

Above the humidity separators 11 are disposed two stages 14 and 15 of separators according to the invention, each formed by four separators 16 of the invention, said separators forming the eight vertical walls of two parallelepipeds whose inside are directly related to the steam outlet pipe 17.

Figure 2:
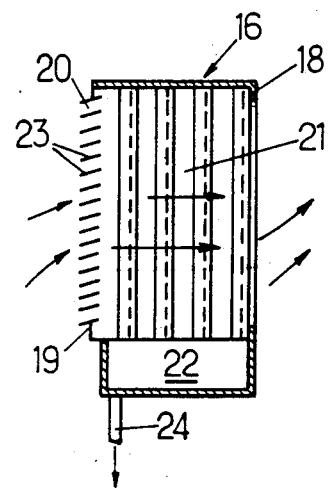
FIG. 2 is a sectional view through II—II of FIG. 1 of the separator according to the invention.
Figure 3:
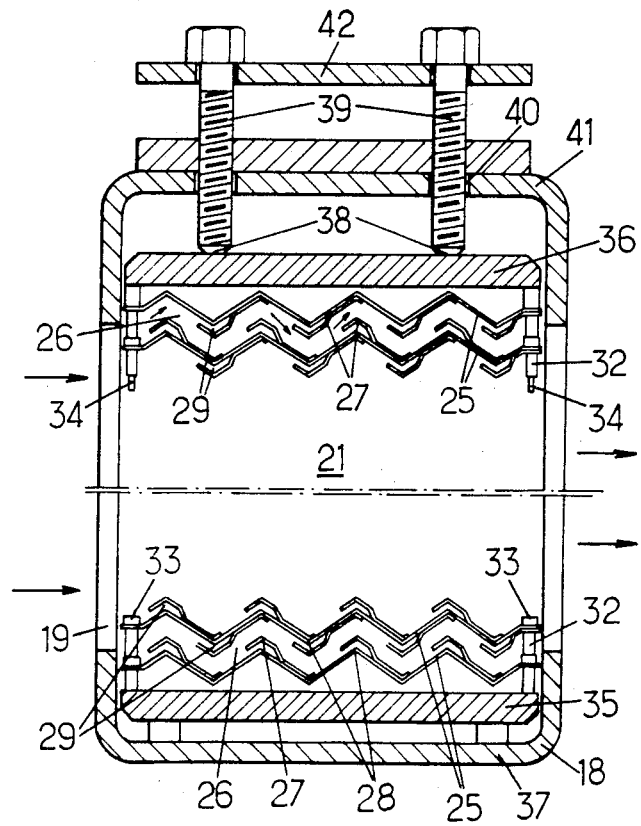
FIG. 3 is a sectional view through III—III of FIG. 1 of a separator according to the invention.

Referring to FIGS. 2 and 3, which represent the separator 16 respectively in vertical section and in horizontal section, the separator includes an enclosure 18 with an inlet dividing wall 19 having holes 20 and/or fixed vanes 23 for orientating the streams of the steam flow penetrating into the separator 16.

Under the water-steam separation zone 21 is disposed a water collecting zone 22. This water is evacuated through tubes 24 which open into the water supply zone 10 of the generator.

The separation zone 21 includes parallel walls 25 having a zigzag configuration and defining therebetween flow channels 26 for the steam. The zigzags are formed by bending metal plates.

Partitions or walls 25 carry fins 27 in accordance with the invention, covering each inwardly directed or convex fold 28 of each channel, the folds forming sharp edged dihedrons. Each fin forms an open scoop 29 facing the gaseous flow.

In FIG. 3, and for simplifying, only four walls have been shown.

Each fin 27 (FIG. 4) has a first portion having two parts 27a and 27b parallel to the wall 25 which supports it, upstream (27a) and downstream (27b) of the summit of the convex fold 28 covered. The first portion is extended by a rear connection zone or second portion 27c gradually joining wall 25 and connected thereto along a root line substantially in the same plane orthogonal to the two partitions defining the channel than the leading edge of the immediate downstream following fin in the channel. A dash dot line (FIG. 4) joining the point of connection of fin 27 with the leading edge of the following fin has been drawn to illustrate this arrangement.

Without being limitative, the connection line or root is situated approximately in the middle of a distance separating two successive folds of a same zigzag wall.

The flow section of the gas path between fins and opposite walls which is substantially constant along the whole path of the gas stream in a channel may advantageously represent about 3/5 of the total section of the channel. The rear zone 27c of fin 27 further provides guiding of the gas stream. The pressure drops recorded with such an arrangment are much less important than those obtained with the prior art devices comprising open scoops facing the gas flow.

Each fin 27 (FIG. 4) is fixed to a wall 25 by a bent part 30 extending the rear zone 27c which matches the exact shape of the wall over a length including the obtuse or concave angled fold 31 succeeding the convex fold 28 covered by the fin 27. Such an arrangement presents important advantages during the construction of the separator where fins are fixed on wall 25 for example by welding. The accurate positioning of the fins is therefore possible assuring and maintaining an accurate and well defined inlet section of the scoop 29 facing the gas stream, an important parameter for obtaining optimum efficiency.

In FIG. 3, each zig zag wall 25 has at least four spacer elements 32 disposed at the periphery of the walls, each spacer element having an aperture 33 on one side and a stud 34 on the other side; the studs 34 of the spacer elements 32 of one wall are arranged for insertion in the apertures 33 of the adjacent wall 25.

The zig zag walls 25 are maintained between two plates (35, 36) one 35 of which bears on a first wall 37 of the enclosure 18 and the other of which is pressed by the end 38 of bolts or screws 39 whose thread 40 engaged holes in the opposite wall 41 to wall 37 of enclosure 18.

The heads of bolts 39 are joined together by at least a small plate, lame or rod 42. The screws are provided in sufficient number to assure an homogeneous mutual compression of the zig zag walls on each others.

The operation of the steam generator having separators 16 of the type described in the invention is explained hereafter.

The water of the primary coolant circuit of the reactor flows through the tubes 3 of the evaporator assembly, the water of the secondary circuit of the reactor flowing outside tubes 3. The water of the secondary circuit penetrate through the inlet pite 8 and is distributed over the periphery of the inside of the generator by ring 9.

This water descends along the external enclosure 1, between enclosure 1 and the cylindrical casing 4. It naturally rises through the tubes bundle 3 and is vaporized in contact with tubes 3 where the primary coolant flows, and passes through holes 5 a part of which has been provided for this purpose in the spacer plates 6.

The paths then followed by the water-steam emulsion leaving the evaporator assembly 2 are shown by arrows in FIG. 1.

The saturated steam begins by flowing through the cyclone humidity separators 11 of known type, comprising the fan 12 and a cylindrical wall 13.

By centrifugal extraction due to the forced helical path imposed on the steam, a part of the water droplets transported thereby is retained on the internal surface of wall 13 and goes into the water supply zone 10.

This water is mixed with the supply water arriving through pipe 8 and partially heats it.

The steam, still following the paths shown by the arrows (see also FIGS. 2, 3 and 4) penetrates into the separators 16 through their periphery in a rising stream, goes through the separators 16 and leaves the generator through the central steam outlet pipe 17.

When flowing through the separator 16, the liquid particles contained in the gas stream are trapped by the scoops 29. With the device of the invention, and even when the gas flow rate is low, the small particles are stopped. This improved trapping with a low flow rate is due to the double change of direction of the flow for each portion of the zig zag walls having the same direction, i.e. each vertical plane part of the wall or partition located between two successive folds (a concave fold and a convex fold) and to the presence of a constant flow section which gives to the flow a speed without abrupt changes which are due to restrictions and enlargements in conventional separators.

Figure 4:
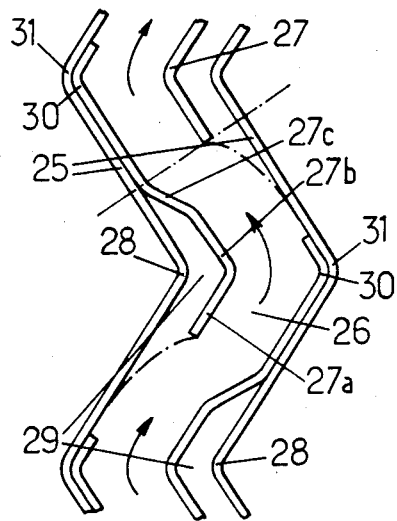
FIG. 4 is a view on a larger scale showing the detail of a channel separating the two finned walls of the separator of the invention.

This flow section is shown by a dot dash line on FIG. 4.

The water thus collected flows down along the fins 27. The rear internal zone of scoop 29 or water spout situated downstream of the summit of fold 28 being relatively protected from the gas stream and its disturbances, the risk of re-entrainement is minimized. In fact, if the water collected by the wall travels to the bottom of the bent spout, this arrangement protects the small particles from being re-entrained by the steam flow. Furthermore, the evacuating downflow section for the collected water is large, which improves the draining capacity. The water falls by gravity into the collecting zone 22 of separator 16 and is removed through pipes 24 which open into the water supply zone 10 of the generator.

I claim:

1. An apparatus for separating entrained liquid particles from a stream of gas which flows in a generally horizontal direction comprising:

an enclosure and a plurality of generally parallel partitions of zig zag horizontal cross-sectional shape, distributed at even intervals within said enclosure and defining a plurality of inter-partition channels constituting respective sinuous travelling paths for said stream of gas, each of said paths having alternate bends, each of said bends being defined by a concave vertical fold of one of the partitions defining the path and a convex vertical fold of the other partition defining the path, and each of said convex vertical folds being provided with respective vertically extending channels defining a fin, wherein each fin has a first portion covering the respective convex vertical fold, substantially parallel to said respective convex vertical fold and at a distance thereof over a length which is a fraction of the distance between two successive folds of a same partition, for forming with said respective convex vertical fold an open scoop having a leading edge and facing the gas flow and a second portion progressively joining the downstream part of the convex vertical fold of the partition covered connected to said downstream part along a root line, and fixed to said partition, said root line and the leading edge of the next downstream fin covering the downstream following fold of the same channel being located substantially in the same plane ortogonal to the two partitions defining said channel.

2. An apparatus according to claim 1, wherein each fold of the zigzag partitions is formed by a single bend.

3. An apparatus according to claim 1, wherein each fin is connected to the corresponding partition by a distal end having a bend part which matches the shape of said partition over a length including the following concave vertical fold succeeding the convex vertical fold covered by said fin.

4. An apparatus according to claim 1, wherein each fold forming bend of the zigzag partitions is a sharp angled dihedron.

5. An apparatus according to claim 1, wherein each zigzag partition is provided with at least four spacer elements disposed at the periphery of said partition, each of the spacing elements having an aperture on one side and a stud on the other side, the studs of the spacer elements of a partition being arranged for insertion in the corresponding apertures of the spacer elements of the adjacent partition for connection.

6. An apparatus for separating entrained liquid particles from a stream of gas comprising an enclosure and a plurality of generally parallel partitions of zig zag horizontal cross-sectional shape distributed at even intervals within said enclosure and defining a plurality of inter-partition channels constituting respective sinuous travelling paths for said stream of gas, each of said paths having alternate bends each defined by a concave vertical fold of one of the partitions defining the path and a convex vertical fold of the other partition defining the path, and each of said convex vertical folds being provided with a respective vertically extending channel defining a fin forming an open scoop with said partition wherein the fins of a same channel are arranged to define with the opposite corresponding partition of said channel a substantially constant flow section for the gas flow all along the path of said gas flow in said channel.

* * * * *

UNITED STATES PATENT AND TRADEMARK OFFICE
CERTIFICATE OF CORRECTION

PATENT NO. : 4,738,698

DATED : April 19, 1988

INVENTOR(S) : Holcblat

It is certified that error appears in the above-identified patent and that said Letters Patent is hereby corrected as shown below:

On the title page assignee should read

--(73) Assignee: Framatome--.

Signed and Sealed this

Fourth Day of July, 1989

Attest:

DONALD J. QUIGG

*Attesting Officer*  *Commissioner of Patents and Trademarks*